United States Patent [19]
Wojtulewicz

[11] 3,710,629
[45] Jan. 16, 1973

[54] THREE-AXIS ACCELEROMETER
[75] Inventor: Waclaw Wojtulewicz, Paterson, N.J.
[73] Assignee: The Singer Company, New York, N.Y.
[22] Filed: July 22, 1970
[21] Appl. No.: 57,239

[52] U.S. Cl. .................................73/510, 73/516
[51] Int. Cl. ................................G01p 15/08
[58] Field of Search.................73/516, 517, 510

[56] References Cited

UNITED STATES PATENTS

| | | | |
|---|---|---|---|
| 3,000,221 | 9/1961 | Entin | 73/517 B |
| 3,272,016 | 9/1966 | Mullins, Jr. | 73/517 B |
| 3,304,787 | 2/1967 | Chiku et al. | 73/517 |
| 3,438,265 | 4/1969 | Davies et al. | 73/516 |
| 3,339,419 | 9/1967 | Wilcox | 73/517 B |
| 3,132,521 | 5/1964 | Krupick et al. | 73/517 B |
| 3,001,407 | 9/1961 | Wiancko et al. | 73/516 X |

Primary Examiner—James J. Gill
Attorney—S. A. Giarratana and Thomas W. Kennedy

[57] ABSTRACT

An accelerometer wherein proofmass means is adapted for movement with respect to three coordinate axes in response to acceleration along the axes. A signal is generated in response to the movement for providing a readout proportional to acceleration, and for restoring the proofmass means to a null position.

7 Claims, 9 Drawing Figures

PATENTED JAN 16 1973

INVENTOR
WACLAW WOJTULEWICZ

BY Thomas W. Kennedy
S. A. Gierratana
ATTORNEY

INVENTOR
WACLAW WOJTULEWICZ

BY Thomas W. Kennedy

ATTORNEY

PATENTED JAN 16 1973
3,710,629
SHEET 3 OF 4
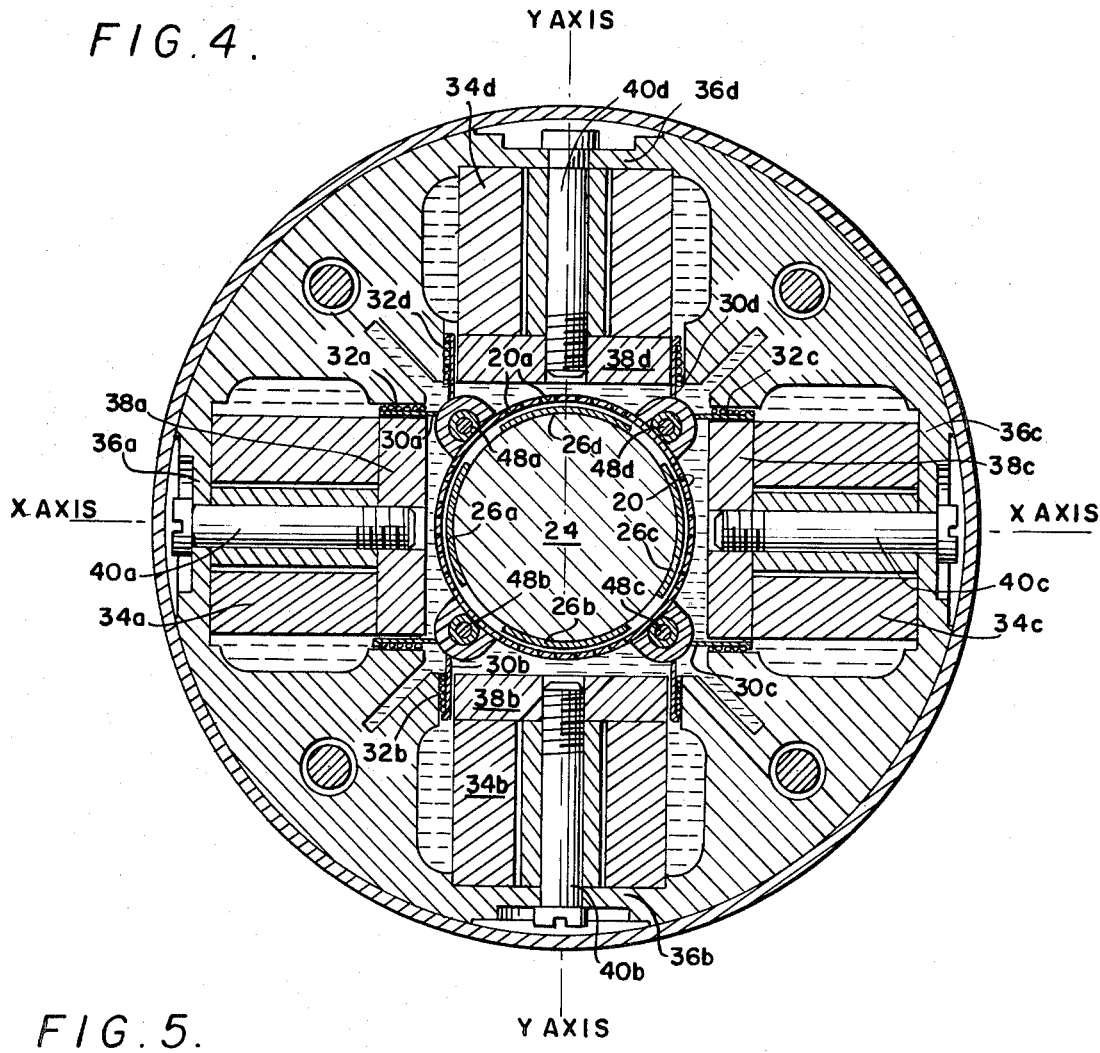
FIG. 4.
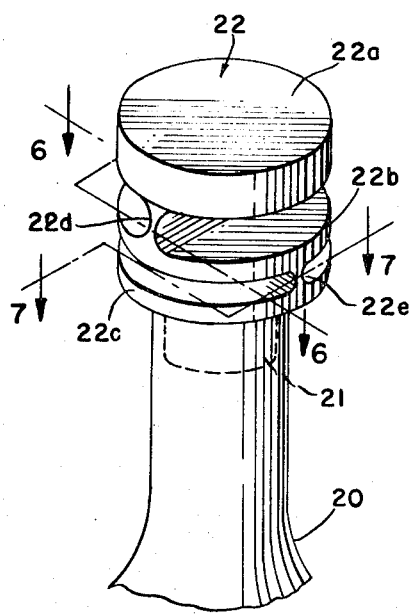
FIG. 5.
FIG. 6.
FIG. 7.
INVENTOR
WACLAW WOJTULEWICZ
BY Thomas W. Kennedy
ATTORNEY

PATENTED JAN 16 1973 3,710,629

INVENTOR
WACLAW WOJTULEWICZ

BY Thomas W. Kennedy
ATTORNEY

THREE-AXIS ACCELEROMETER

BACKGROUND OF THE INVENTION

This invention relates to an instrument for measuring acceleration, and, more particularly, to such an instrument which permits acceleration to be measured along three mutually orthogonal axes.

Single-axis accelerometers are well known, and normally utilized a pendulous mass, or proofmass, carrying a displacement transducer and electromagnetic torquer and adapted for pivotal movement along one axis in response to acceleration. The proofmass moves between a pair of spaced magnets carrying the fixed elements of the transducer, so that the latter generates an output signal which activates the torquer and causes the proofmass to return to a null position, the signal being proportional to acceleration along this axis. However, in systems requiring the measurement of acceleration about three reference axes, three of these single-axis accelerometers must be mounted in the vehicle which adds to the weight and bulk of the vehicle, and therefore poses a severe limitation to the system.

Although the above disadvantage has been alleviated somewhat by the introduction of two-axis accelerometers, this still requires the use of an additional single-axis instrument.

SUMMARY OF THE INVENTION

It is therefore an object of the present invention to provide an accelerometer of the above type which generates a signal proportional to acceleration about three reference axes, and yet which is compact in size.

Toward the fulfillment of this object, the accelerometer of the present invention comprises proofmass means adapted for movement relative to three reference positions established with respect to three mutually orthogonal axes in response to acceleration along said axes, and means to generate a signal in response to said movement.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope.

In the drawings:

FIG. 4 is a cross-sectional view taken along the line 4—4 of FIG. 3;

FIG. 5 is a perspective view of the hinge joint used in the accelerometer of FIGS. 1–4;

FIGS. 6 and 7 are cross-sectional views taken along the lines 6—6 and 7—7, respectively, of FIG. 5;

DESCRIPTION OF THE PREFERRED EMBODIMENTS

Figure 1:
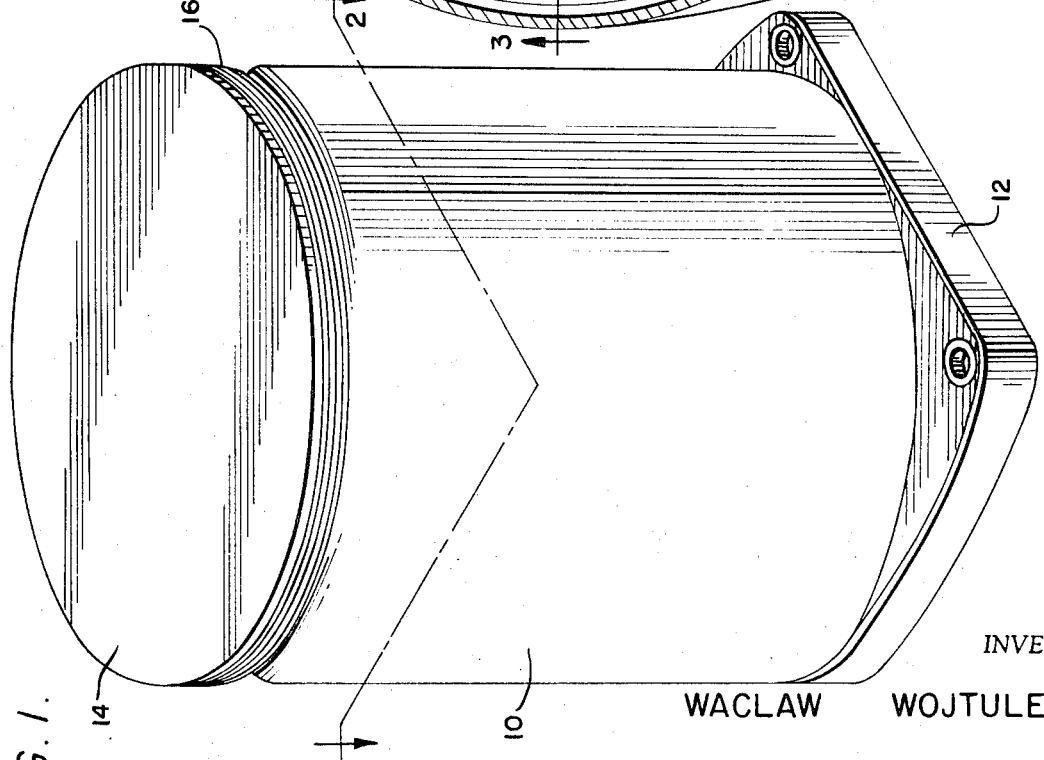
FIG. 1 is a perspective view of the accelerometer of the present invention.

Referring specifically to FIG. 1 of the drawings, an accelerometer is shown comprising an outer casing 10 having a flanged base portion 12 which is adapted to be connected to a platform or the like in an inertial guidance system for a vehicle. A cover 14 is attached to the casing 10 by means of an expandable bellows 16, to be described in detail later.

Figure 2:
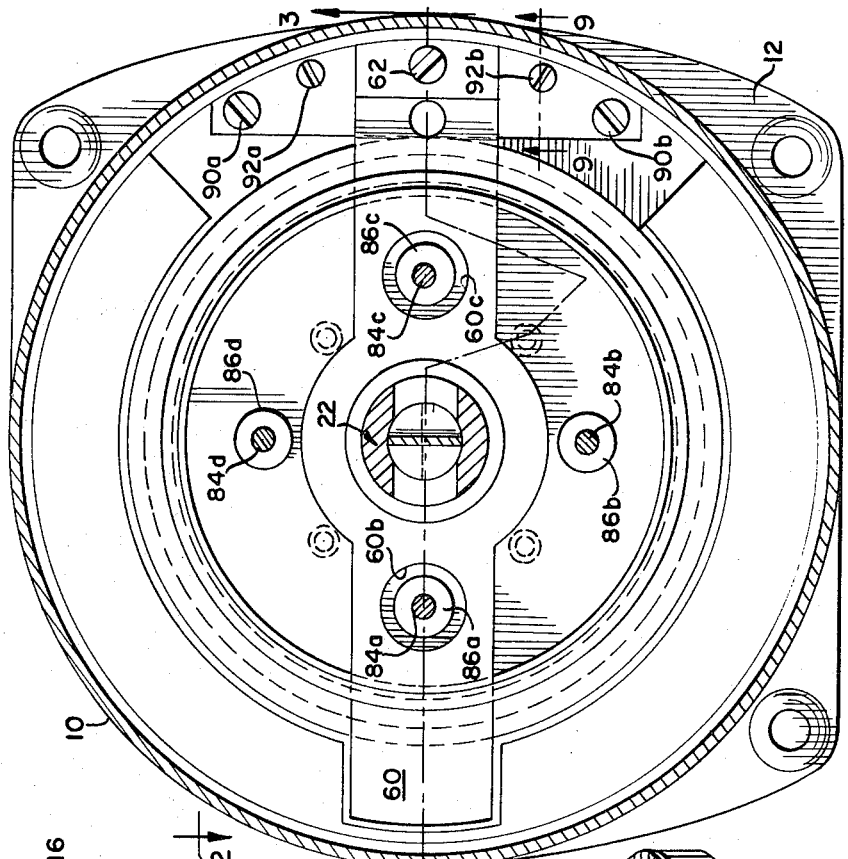
FIG. 2 is a cross-sectional view taken along the line 2—2 of FIG. 1.
Figure 3:
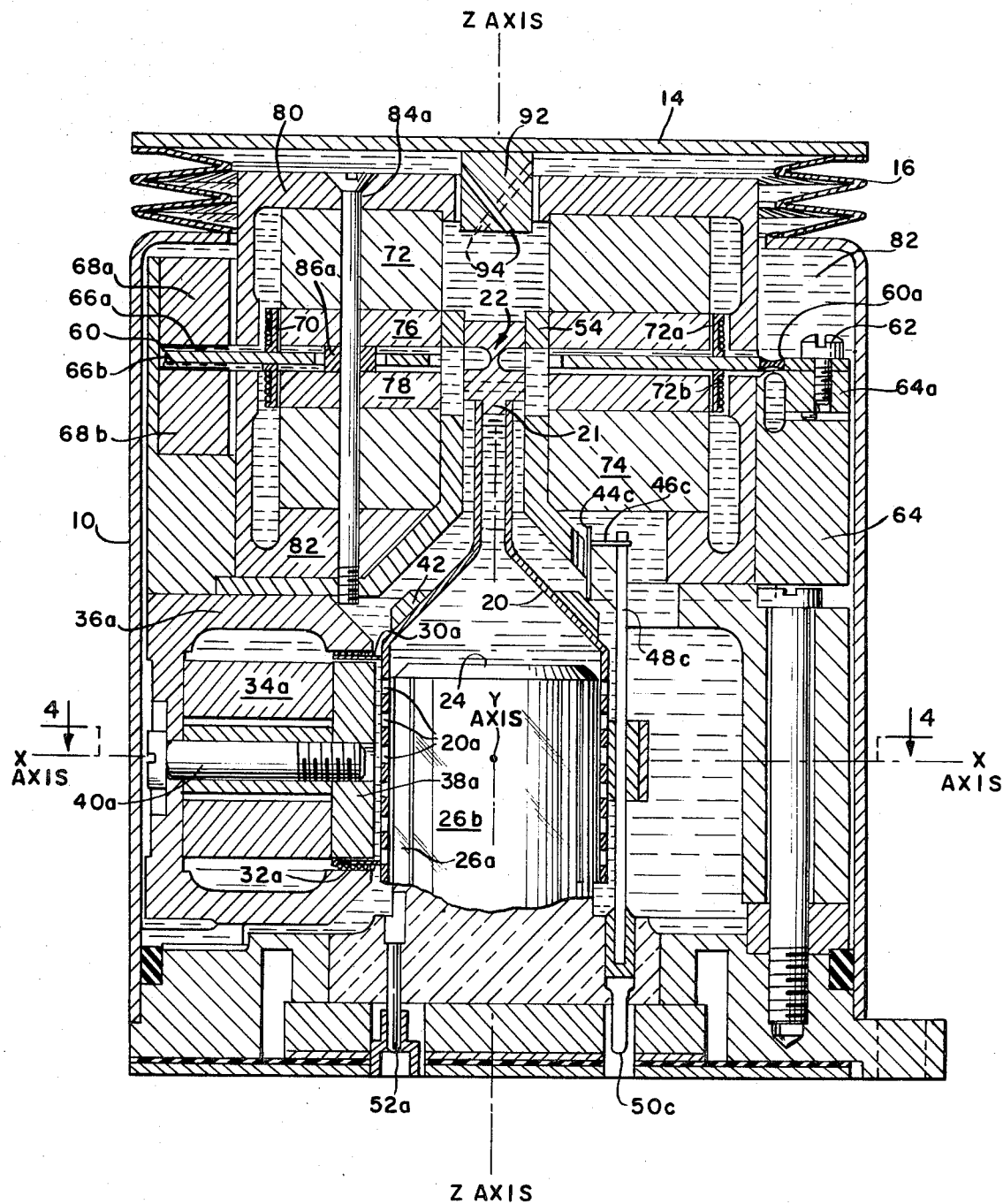
FIG. 3 is a cross-sectional view taken along the line 3—3 of FIG. 2.

Referring to FIGS. 2–4, and, in particular, to FIG. 3, a generally bell-shaped proofmass member 20 is centrally located within the casing 10, and is connected to a stub shaft 21 of a hinge joint 22 by means of joining the stub shaft within the neck of the proofmass member. The hinge joint 22 permits the proofmass member 20 to pivot about the X and Y axes and will be described in further detail later. A column 24 of insulating material, such as glass, is fixedly mounted within the casing and extends within the main body portion of the proofmass member 20. A plurality of capacitor plates 26a, 26b, 26c, and 26d extend around the outer circumference of the column 24 in a closely spaced relation to the inner wall of the main body portion of the proofmass member 20, each plate forming an electric capacitor with the corresponding facing portion of the inner wall.

A plurality of circular flanges 30a, 30b, 30c, and 30d are formed on the outer surface of the main body portion of the proofmass member 20 and receive torquer coils 32a, 32b, 32c, and 32d, respectively. These torquer coils are disposed within a gap in a magnetic path provided by a plurality of magnets 34a, 34b, 34c, and 34d, a plurality of magnet holders 36a, 36b, 36c, and 36d, and a plurality of pole pieces 38a, 38b, 38c and 38d. The magnets 34, the magnet holders 36, and the pole pieces 38 are all held in an assembled condition by a set of mounting screws 40a, 40b, 40c and 40d extending through central openings formed therethrough.

As a result of the above, relative pivotal movement between the casing 10 and the main body portion of the proofmass member 20 along the X and Y axes causes the torquer coils 32 to move in the magnetic gaps defined between the ends of their respective magnet holders 36 and the corresponding pole pieces 38.

A circular shoulder 42 is mounted on the tapered portion of the proofmass member 20, and is adapted to receive a conductor from each of the coils 32a, 32b, 32c and 32d, only one of the conductors 44c being shown in FIG. 3. This latter conductor is, in turn, connected to a rigid conductor 48c by means of a flex lead 46c which allows the above connection to be made despite relative movements between the proofmass member 20 and the casing 10.

Each of the conductors 48 is affixed to a corresponding male pin 50, as shown by the conductors 48c and 50c in FIG. 3. It is understood that three other sets of connections similar to those between the conductors 44c, 46c, 48c and 50c are provided in connection with the coils 32a, 32b, and 32d, respectively. A male pin 52a is also electrically connected to the capacitor formed by the inner wall of the main body portion of the proofmass member 20 and the plate 26a, it being understood that three other pins connecting the remaining capacitors are also provided. The free ends of the pins 50 and 52 are disposed in corresponding openings formed in the base of the casing 10 for connection to external circuity, as shown by the pins 50c and 52a in FIG. 3.

The details of the hinge joint 22 are shown in FIGS. 5-7. The hinge joint is manufactured from a solid rod which is machined to form three cylindrical portions 22a, 22b, and 22c, and two necked-down portions 22d and 22e. The cylindrical portion 22a is fixedly attached to a mounting ring 54 (FIG. 3), and the necked-down portions 22d and 22e provide the pivotal movement of the main body portion of the proofmass member along the Y and X axes, respectively.

Figure 8:
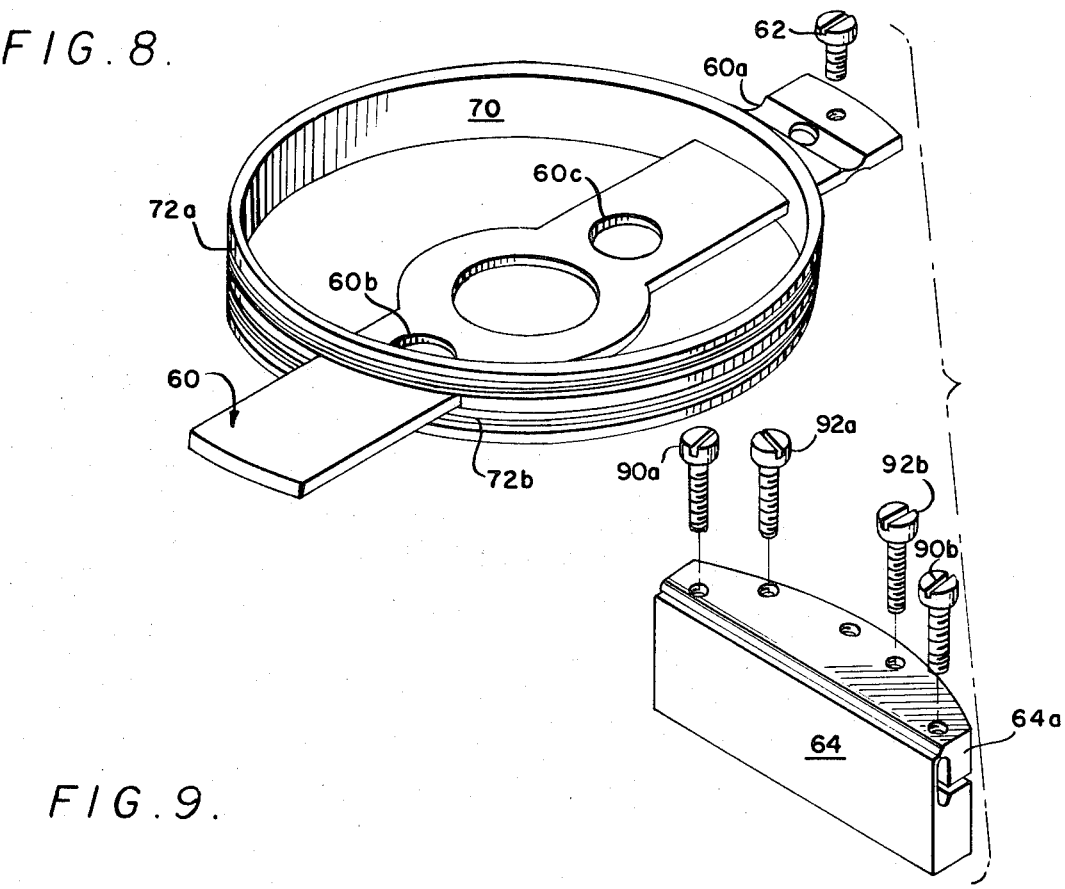
FIG. 8 is a partial exploded perspective view of a portion of the accelerometer of FIGS. 1–7.

Referring to FIGS. 2, 3, and 8, another proofmass member, in the form of a pendulum 60, is mounted by a bolt 62 to a hinge portion 64a of a pendulum base 64. The pendulum 60 has a necked-down portion 60a so that it will pivot in a general up and down direction along the Z axis viewed in FIG. 3 about the necked-down portion.

Two fixed capacitor plates 66a and 66b are provided in closely spaced relation to the upper and lower surfaces of the pendulum 60 near the free end thereof, to form two electric capacitors. The plates 66a and 66b are mounted on the outer surfaces of two electronic assemblies 68a and 68b, respectively, which include amplifiers to amplify the signals produced by the capacitors.

A circular flange 70 is provided on the pendulum 60 and has a pair of torquer coils 72a and 72b wrapped therearound. Upon the above-mentioned pivotal movement of the pendulum 60, the torquer coils respectively move in a pair of gaps in two magnetic paths defined by a pair of circular magnets 72 and 74, a pair of circular pole pieces 76 and 78, and a pair of magnet holders 80 and 82. By this arrangement the magnetic gaps are defined between the outer circumference of the pole pieces 76 and 78 and their corresponding magnet holders 80 and 82. A plurality of mounting screws 84a, 84b, 84c and 84d are provided to assemble the above magnets, pole pieces and magnet holders with spacers 86a, 86b, 86c, and 86d extending between the pole pieces 76 and 78. The spacers 86a and 86c extend through corresponding holes 60b and 60c, respectively, provided in the pendulum 60, and shown in FIG. 2.

Figure 9:
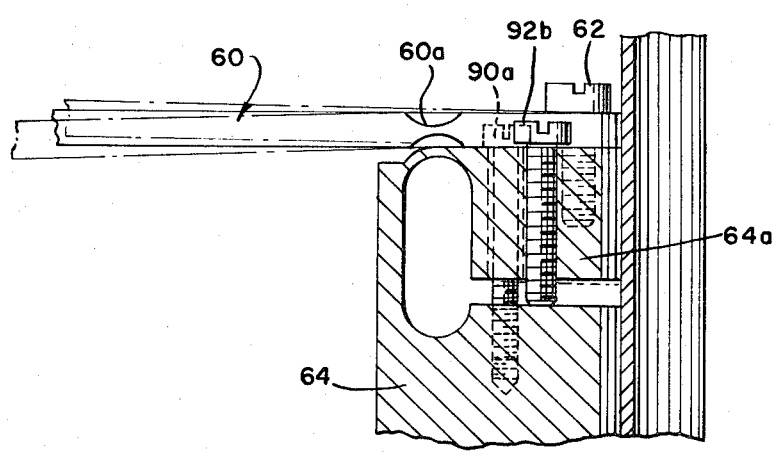
FIG. 9 is a cross-sectional view taken along the line 9—9 of FIG. 2.

As shown in FIGS. 8 and 9, a plurality of threaded adjustment bolts 90a, 90b, 92a, and 92b are provided to adjust the angular position of the hinge portion 64a relative to the pendulum base 64 and, therefore, the position of the free end of the pendulum 60 with respect to the fixed capacitor plates 66a and 66b. Each of the adjustment bolts 90a and 90b extends through an elongated opening formed through the hinge portion 64a and into a threaded opening provided in the pendulum base 64. As a result, rotation of the bolts 90a and 90b will cause the hinge portion 64a to pivot relative to the base 64 in a downward direction as viewed in FIG. 9. Each of the adjusting bolts 92a and 92b extends into a threaded opening formed through the hinge portion 64a, with the ends of the bolts engaging the flat upper surface of the pendulum base 64. As a result, rotation of the bolts 92a and 92b in one direction will cause the hinge portion 64a to pivot upwardly, as viewed in FIG. 9.

As a result of the above-mentioned upward and downward movement of the hinge portion 64a, the angular position of the free end of the pendulum 60 relative to the capacitor plates 66a and 66b can be precisely adjusted.

A damping system for the pivotal movements of the proofmass member 20 and the pendulum 60 is provided in accordance with the present invention. This is achieved by the presence of a damping fluid of any known type extending within the casing 10. The most critical disposition of the fluid is to either side of the pendulum 60 and to either side of the wall of the main body portion of the proofmass member 20. A plurality of openings 20a extend through the wall forming the main body portion of the proofmass member 20 so that the damping fluid is "squeezed" through the wall during the relative movement between the casing 10 and the proofmass member.

In order to compensate for variations in the volume of the fluid in response to thermal changes, etc., a fluid damper 92 is provided below, and integral with, the cover plate 14. A plurality of angularly extending conduits 94 connect the internal portion of the casing 10 with a volume defined below the cover plate 14, immediately above the return magnet 80 and within the bellows 16. Therefore, expansion or reduction of the fluid volume will cause the cover plate 14 and the bellows 16 to move accordingly, with the conduits 94 damping the flow of fluid which occurs under these conditions, or vibration.

It can be appreciated that only structure directly relating to the critical operation of the accelerometer of the present invention has been described above, and that specific mention of other supporting structure has been purposely omitted in the interest of brevity.

In operation, the flanged portion 12 of the casing 10 is mounted to a platform, or the like, in a vehicle so that accelerations of the vehicle along the X or Y axis causes corresponding relative movement between the proofmass member 20 and the casing 10, and accelerations along the Z axis causes relative movement between the pendulum 60 and the casing. Movement of the main body portion of the proofmass member 20 along the X axis, for example, causes the capacitors formed by the plates 26a and 26c and the corresponding inner wall portions of the proofmass member 20 to produce a signal which is connected in a servo loop with the torquer coils 32a and 32c, so that the current level through the coils is changed accordingly. The resulting change in magnetic flux produced by the coils is of a magnitude and direction sufficient to interact with the magnetic flux in the respective gap in which the coil operates, to restore the proofmass member 20 to a null position. The above current can be read to provide an indication of acceleration along the X axis. Similarly, the capacitors formed by the plates 26b and 26d and the corresponding portions of the inner wall of the proofmass member 20, and the capacitors formed by the plates 66a and 66b and the corresponding portions of the pendulum 60 are adapted to produce a signal and resulting restoration, in response to movement of the proofmass member 20 along the Y axis, and movement of the pendulum 60 along the Z axis, respectively.

The accelerometer of the present invention thus provides an instrument which is capable of measuring acceleration about three reference axes, yet is in the form of a single-source, compact unit.

Of course, variations of the specific construction and arrangement of the three-axis accelerometer disclosed above can be made by those skilled in the art without departing from the invention as defined in the appended claims.

I claim:

1. A three-axis accelerometer for sensing acceleration along first and second and third axes of three axes which are in quadrature, comprising: a casing with an elongate axis corresponding to said third axis, said casing having a peripheral wall and first and second axially spaced end walls forming a cavity containing a damping fluid, said casing having an intermediate wall dividing said cavity into first and second axially spaced chambers, an inner body disposed in said first chamber coaxially therewith and mounted on said first end wall, said inner body having a radially outer face facing said peripheral wall, a first bell-shaped proof mass disposed in said damping fluid within said first chamber for motion transverse to said casing axis, said first proof mass having a universal-type first flexure member fixedly connected to said intermediate wall, said first proof mass having a radially inner surface facing said radially outer face and having a radially outer surface facing said peripheral wall, a second elongate proof mass disposed in said damping fluid within said second chamber for motion along said casing axis, said second proof mass having a single-axis flexure member at one end thereof fixedly connected to said peripheral wall, torquer means to establish a reference position for each said proof mass with respect to each of said three coordinate axes, said first and second proof mass being adapted to move with respect to said reference positions in response to acceleration along said axes, said torquer means including first torquer means and second torquer means and third torquer means, said first and second torquer means being disposed in said first chamber between said radially outer surface and the adjacent portion of said peripheral wall, said third torquer means being disposed in said second chamber between said intermediate wall and said second end wall, and pickoff means to generate a signal in response to said movement, said pickoff means including a first pickoff means and a second pickoff means and a third pickoff means, said first and second pickoff means being disposed in said first chamber between said radially inner surface and said radially outer face, said first and second pickoff means being disposed coaxially with regard to said first and second axes respectively for sensing acceleration components along said axes, said third pickoff means being mounted on said peripheral wall and disposed in said second chamber adjacent said second proof mass for sensing an acceleration component along said third axis, wherein said intermediate wall is fixedly connected to said peripheral wall coaxially therewith, said intermediate wall having a ring-shaped wall portion fixedly connected to said first flexure member coaxially therewith for supporting said first proof mass, said second proof mass having an annular portion encircling said ring-shaped wall portion coaxially therewith.

2. The accelerometer of claim 1 wherein each said pickoff means comprises a pair of capacitor plates disposed in proximity to axially opposite portions of its proof mass and forming an electrical capacitor, and means to establish an electrical circuit including each said capacitor plate, said movement of its proof mass adapted to vary the capacitance of said capacitor.

3. The accelerometer of claim 2 wherein each said torquer means comprises magnetic means disposed in said casing and positioned with respect to one of said axes in proximity to its proof mass.

4. The accelerometer of claim 3 wherein each said torquer means further includes a pair of torquer coils mounted on adjacent axially opposite portions of its proof mass and connected in said electrical circuit for creating a magnetic flux in response to said signal for interaction with the magnetic flux produced by said magnetic means in a manner to realign said proof mass.

5. The accelerometer of claim 1 wherein said fluid is disposed in said first and second casing chambers for damping said movement of said first proof mass and said second proof mass, and including compensating means having bellows connecting to said second end wall and to said peripheral wall to compensate for increases and decreases in the volume of said fluid due to temperature changes.

6. The accelerometer of claim 1 wherein said single axis flexure member has support means, said support means including, a base member fixedly connected to said peripheral wall, a mounting member pivotally mounted with respect to said base member, and adjusting means to adjust the relative angular position of said mounting member relative to said base member to adjust the operating position of said single axis flexure member and said second proof mass.

7. A three-axis accelerometer for sensing acceleration along first and second and third axes of three axes which are in quadrature, comprising: a casing with an elongate axis corresponding to said third axis, said casing having a peripheral wall and first and second axially spaced end walls forming a cavity containing a damping fluid, said casing having an intermediate wall dividing said cavity into first and second axially spaced chambers, an inner body disposed in said first chamber coaxially therewith and mounted on said first end wall, said inner body having a radially outer face facing said peripheral wall, a first bell-shaped proof mass disposed in said damping fluid within said first chamber for motion transverse to said casing axis, said first proof mass having a universal-type first flexure member fixedly connected to said intermediate wall, said first proof mass having a radially inner surface facing said radially outer face and having radially outer surface facing said peripheral wall, a second elongate proof mass disposed in said damping fluid within said second chamber for motion along said casing axis, said second proof mass having a single-axis flexure member at one end thereof fixedly connected to said peripheral wall, torquer means to establish a reference position for each said proof mass with respect to each of said three coordinate axes, said first and second proof mass being adapted to move with respect to said reference positions in response to acceleration along said axes, said torquer means including first torquer means and second torquer means and third torquer means, said first and second torquer means being disposed in said first chamber between said radially outer surface and the adjacent portion of said peripheral wall, said third torquer means being disposed in said second chamber between said intermediate wall and said second end wall, and pickoff means to generate a signal in response to said movement, said pickoff means including a first pickoff means and a second pickoff means and a third pickoff means being disposed in said first chamber between said radially inner surface and said radially outer face, said first and second pickoff means being disposed coaxially with regard to said first ad second axes respectively for sensing acceleration components along said axes, said third pickoff means being mounted on said peripheral wall and disposed in said second chamber adjacent said second proof mass for sensing an acceleration component along said third axis, wherein said fluid is disposed in said first and second casing chambers for damping said movement of said first proof mass and said second proof mass, and including compensating means having bellows connecting said second end wall to said peripheral wall to compensate for increases and decreases in the volume of said fluid due to temperature changes, and wherein said compensating means also includes orifice means to dampen the flow of said fluid resulting from said increases and decreases in its volume, said orifice means including a partition wall fixedly connected to said peripheral wall for dividing said second cavity chamber into first and second chamber portions, said partition wall having a cylindrical opening, a damper member having one end portion fixedly connected to said second end wall and having an opposite end portion received in said cylindrical opening, said damper member having a plurality of helical-shaped conduits for controlling the flow of said fluid between said first and second chamber portions.

* * * * *